US011912340B2

(12) United States Patent
Chino

(10) Patent No.: US 11,912,340 B2
(45) Date of Patent: Feb. 27, 2024

(54) VEHICLE BODY REAR PART STRUCTURE

(71) Applicant: HONDA MOTOR CO., LTD., Tokyo (JP)

(72) Inventor: Shungo Chino, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 17/674,937

(22) Filed: Feb. 18, 2022

(65) Prior Publication Data

US 2022/0281529 A1 Sep. 8, 2022

(30) Foreign Application Priority Data

Mar. 4, 2021 (JP) ................. 2021-034626

(51) Int. Cl.
*B62D 25/08* (2006.01)
*B62D 21/15* (2006.01)
*B62D 25/02* (2006.01)
*B62D 25/16* (2006.01)
*B62D 27/06* (2006.01)
(Continued)

(52) U.S. Cl.
CPC .............. *B62D 25/08* (2013.01); *B62D 21/11* (2013.01); *B62D 21/157* (2013.01); *B62D 25/025* (2013.01); *B62D 25/16* (2013.01); *B62D 25/2027* (2013.01); *B62D 25/2036* (2013.01); *B62D 27/065* (2013.01)

(58) Field of Classification Search
CPC ...... B62D 25/00; B62D 25/08; B62D 25/025; B62D 25/2027; B62D 25/2036; B62D 21/157

USPC ......... 296/204, 203.01, 203.04, 209, 29, 30, 296/187.12
See application file for complete search history.

(56) References Cited

U.S. PATENT DOCUMENTS

2019/0276094 A1 9/2019 Kondo et al.
2020/0070897 A1 3/2020 Xiao et al.

FOREIGN PATENT DOCUMENTS

| CN | 107021137 | 8/2017 |
| CN | 108001537 | 5/2018 |
| CN | 109496191 | 3/2019 |

(Continued)

OTHER PUBLICATIONS

Chinese Notice of Allowance for Chinese Patent Application No. 202210145637.4 dated May 29, 2023.
(Continued)

*Primary Examiner* — Dennis H Pedder
(74) *Attorney, Agent, or Firm* — Amin, Turocy & Watson, LLP

(57) ABSTRACT

A vehicle body rear part includes a side sill, a rear wheel house, a rear side frame, and a close plate. An outer curve part and an inner curve part are provided in a region close to a front part of the rear wheel house of the rear side frame. An outer ridge line that extends straight in a vehicle forward direction from a position substantially directly above the vicinity of a rear end portion of the outer curve part of the rear side frame and an inner ridge line that extends to be curved to a vehicle forward side substantially along the inner curve part at a position substantially directly above the inner curve part of the rear side frame are provided on the close plate. The outer ridge line and the inner ridge line converge in an inner region in the vehicle width direction of a joint part of the rear side frame and the side sill.

8 Claims, 11 Drawing Sheets

(51) Int. Cl.
  *B62D 21/11*   (2006.01)
  *B62D 25/20*   (2006.01)

(56) References Cited

FOREIGN PATENT DOCUMENTS

| | | |
|---|---|---|
| DE | 102008057352 | 5/2009 |
| JP | 2012-180057 | 9/2012 |
| JP | 2013-014274 | 1/2013 |
| JP | 2015-071327 | 4/2015 |
| JP | 2017-071232 | 4/2017 |
| JP | 2017-180056 | 10/2017 |

OTHER PUBLICATIONS

Japanese Notice of Allowance for Japanese Patent Application No. 2021-034626 dated Oct. 4, 2022.

VEHICLE BODY REAR PART STRUCTURE

CROSS-REFERENCE TO RELATED APPLICATION

Priority is claimed on Japanese Patent Application No. 2021-034626, filed on Mar. 4, 2021, the contents of which are incorporated herein by reference.

BACKGROUND

Field of the Invention

The present invention relates to a vehicle body rear part structure.

Background

As vehicle body rear part structures, such a structure is known in which a rear side frame is disposed adjacent to an inner side in a vehicle width direction of a rear wheel house, a front region of the rear side frame is curved to an outer side in the vehicle width direction along a curve shape (a curve shape of a horizontal cross section) of a front part of the rear wheel house, and the front end portion is joined to an inner side in the vehicle width direction of a side sill (for example, refer to Japanese Unexamined Patent Application, First Publication No. 2012-180057).

In the vehicle body rear part structure described in Japanese Patent Application, First Publication No. 2012-180057, an upper part of a rear side frame (rear frame lower part) having a substantially C-shaped cross section that opens to an upper side is closed by a close plate (rear frame upper part). An outer curve part that curves outward in the vehicle width direction substantially along the curve shape of a front part of the rear wheelhouse is provided on an outer side wall in the vehicle width direction of the front region of the rear side frame. On the other hand, an inner side wall in the vehicle width direction of the front region of the rear side frame extends straight forward.

The close plate is formed substantially along a top view shape of the rear side frame, and a ridge line part that extends straight in a forward/rearward direction along the inner side wall in the vehicle width direction of the front region of the rear side frame is formed at a position directly above the side wall.

In the vehicle body rear part structure described in Japanese Patent Application, First Publication No. 2012-180057, the straight ridge line part of the close plate is arranged at the position directly above the inner side wall in the vehicle width direction of the rear side frame. Therefore, when an impact load is input from a rear part of the rear side frame, the load can be efficiently transmitted to the side sill in the front region of the rear side frame.

SUMMARY

In the vehicle body rear part structure described in Japanese Patent Application, First Publication No. 2012-180057, since the inner side wall in the vehicle width direction of the rear side frame extends straight forward, the ridge line part that extends straight can be formed on the inner part in the vehicle width direction of the close plate. However, when the inner side wall in the vehicle width direction of the rear side frame is curved along an outer side wall in the vehicle width direction, the ridge line part that extends straight in the forward/rearward direction cannot be provided in an inner region in the vehicle width direction of the close plate. Therefore, there is a concern that when an impact load is input to the rear side frame from a vehicle rearward side, a portion of the curve part of the rear side frame bends in an irregular direction, and a load transmission to the side sill is inhibited.

An aspect of the present invention provides a vehicle body rear part structure capable of efficiently transmitting an impact load that is input from a vehicle rearward side of a rear side frame to a side sill.

A vehicle body rear part structure according to an aspect of the present invention includes: a side sill that is disposed below a side part of a passenger compartment substantially in a vehicle forward/rearward direction; a rear wheel house that is disposed behind the side sill; a rear side frame that extends to be curved along a curve shape of a horizontal cross section of a front part of the rear wheel house from an inner region in a vehicle width direction of the rear wheel house and that has a front region which is joined to an inside in the vehicle width direction of the side sill; and a close plate that closes an upper part of a substantially C-shaped cross section that opens to an upper side of the rear side frame, wherein an outer curve part having an outer side wall in the vehicle width direction that curves outward in the vehicle width direction substantially along a shape of a front part of the rear wheel house and an inner curve part having an inner side wall in the vehicle width direction that curves and extends outward in the vehicle width direction substantially along the shape of the front part of the rear wheel house are provided in a region close to the front part of the rear wheel house of the rear side frame, an outer ridge line that extends straight in a vehicle forward direction from a position substantially directly above a vicinity of a rear end portion of the outer curve part of the rear side frame and an inner ridge line that curves substantially along the inner curve part at a position substantially directly above the inner curve part of the rear side frame are provided on the close plate, and the outer ridge line and the inner ridge line converge in an inner region in the vehicle width direction of a joint part of the rear side frame and the side sill.

According to the above configuration, when an impact load is input to the rear side frame from a vehicle rearward side, the load is transmitted to the side sill through the rear side frame and the close plate. At this time, in the close plate, the input load is transmitted forward along the outer ridge line and the inner ridge line, and at the converging part of the outer ridge line and the inner ridge line, the input load is transmitted to the joint part between the rear side frame and the side sill. Accordingly, it is possible to efficiently transmit the impact load to the side sill without causing an irregular bend deformation of the close plate or the rear side frame.

A first auxiliary outer ridge line that extends to be curved to a forward side at a position directly above a further outer region in the vehicle width direction than the vicinity of the rear end portion of the outer curve part of the rear side frame may be provided on the close plate.

In this case, an impact load that is input to the rear side frame from a vehicle rearward side is transmitted to a vehicle forward side along not only the outer ridge line and the inner ridge line on the close plate but also the first auxiliary outer ridge line located at an outer position in the vehicle width direction of the outer ridge line. Therefore, a stress is less concentrated on the outer curve part or the inner curve part of the rear side frame.

A second auxiliary outer ridge line that extends in a forward direction in parallel with the outer ridge line at an outside in the vehicle width direction of the outer ridge line may be provided on the close plate, and the outer ridge line and the second auxiliary outer ridge line may constitute a first reinforcement bead that is raised above the close plate and extends in a vehicle forward direction.

In this case, an impact load that is input to the rear side frame from a vehicle rearward side is efficiently transmitted to the side sill through the first reinforcement bead.

A first auxiliary outer ridge line that extends to be curved to a forward side at a position directly above a further outer region in the vehicle width direction than the vicinity of the rear end portion of the outer curve part of the rear side frame may be provided on the close plate, and the inner ridge line and the first auxiliary outer ridge line may constitute a second reinforcement bead that is raised above the close plate and extends in a vehicle forward direction at an outside of the first reinforcement bead.

In this case, an impact load that is input to the rear side frame from a vehicle rearward side is further efficiently transmitted to the side sill through the first reinforcement bead and the second reinforcement bead.

An inner flange that extends inward in the vehicle width direction from an upper part of an inner side wall in the vehicle width direction may be provided on the front region of the rear side frame, and the close plate may be joined to an upper wall on an inside of the side sill and the inner flange and constitute a closed cross section together with the side sill and the front region of the rear side frame.

In this case, since the close plate constitutes a closed cross section together with the rear side frame and the side sill, an impact load that is input to the rear side frame and the close plate from a vehicle rearward side can be further efficiently transmitted by the side sill.

The close plate may be joined to a first cross member that is connected to the side sill in front of the rear side frame.

In this case, an impact load that is input to the rear side frame and the close plate from a vehicle rearward side can also be transmitted to the first cross member. Accordingly, the input impact load can be dispersed and supported by a wide area of the vehicle body.

The vehicle body rear part structure may further include: a trailing arm having a front end part that is swingably supported via a mount member at the front region of the rear side frame; a second cross member that extends substantially in the vehicle width direction and that has an outer end part in the vehicle width direction which is connected to the front region of the rear side frame; and an arm attachment bracket which is fixed to an inside of a cross section having a substantially C shape which opens to an upper side of the front region of the rear side frame and to which the mount member is attached, wherein the arm attachment bracket may include a dome-shaped part that covers the mount member from above, a bracket reinforcement member that extends substantially in the vehicle width direction may be fixed to the dome-shaped part, end parts on both sides in the vehicle width direction of the bracket reinforcement member may be directly or indirectly joined to the side sill and the second cross member, and the close plate may be joined to an upper part of the bracket reinforcement member.

In this case, the arm attachment bracket and the bracket reinforcement member reinforce the cross section of the front region of the close plate and the rear side frame, and the bracket reinforcement member connects the side sill to the second cross member. Therefore, an impact load that is input to the rear side frame and the close plate from a vehicle rearward side can be efficiently transmitted to the side sill and the second cross member.

At least one ridge line along the vehicle forward/rearward direction or the vehicle width direction may be provided near a top portion of the dome-shaped part of the arm attachment bracket.

In this case, the rigidity of the dome-shaped part of the arm attachment bracket is enhanced by the ridge line. Therefore, an impact load that is input from a vehicle rearward side and an impact load that is input from a vehicle lateral side can be received by the dome-shaped part having a high rigidity.

In the vehicle body rear part structure according to an aspect of the present invention, the outer ridge line that extends straight in the vehicle forward direction from a position substantially directly above the vicinity of the rear end portion of the outer curve part of the rear side frame and the inner ridge line that curves substantially along the inner curve part at a position substantially directly above the inner curve part of the rear side frame are provided on the close plate. The outer ridge line and the inner ridge line converge in the inner region in the vehicle width direction of the joint part of the rear side frame and the side sill in the close plate. Therefore, the vehicle body rear part structure according to the aspect of the present invention can efficiently transmit an impact load that is input from a vehicle rearward side of the rear side frame to the side sill while being a structure in which the outer and inner side walls in the vehicle width direction of the front region of the rear side frame have the outer and inner curve parts, respectively.

DESCRIPTION OF EMBODIMENTS

Hereinafter, an embodiment of the present invention will be described with reference to the drawings. In the following description, forward, rearward, upward, downward, rightward and leftward directions mean directions with respect to a proceeding direction of a vehicle unless otherwise specified. An arrow FR that indicates a forward direction of the vehicle, an arrow UP that indicates an upward direction of the vehicle, and an arrow LH that indicates a leftward direction of the vehicle are shown in appropriate positions of the drawings.

Figure 1:
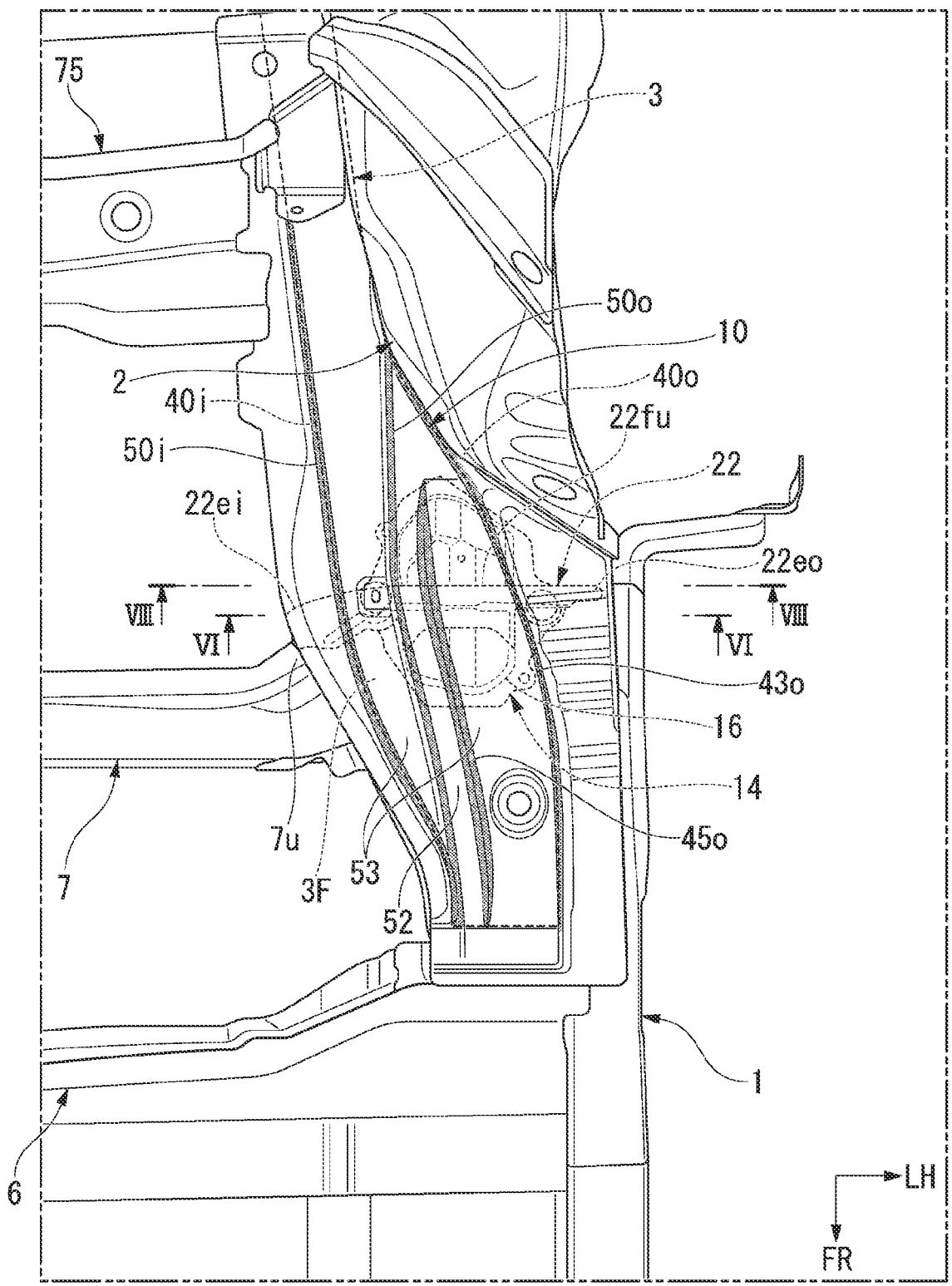
FIG. 1 is a plan view of a vehicle body rear part according to an embodiment.
Figure 2:
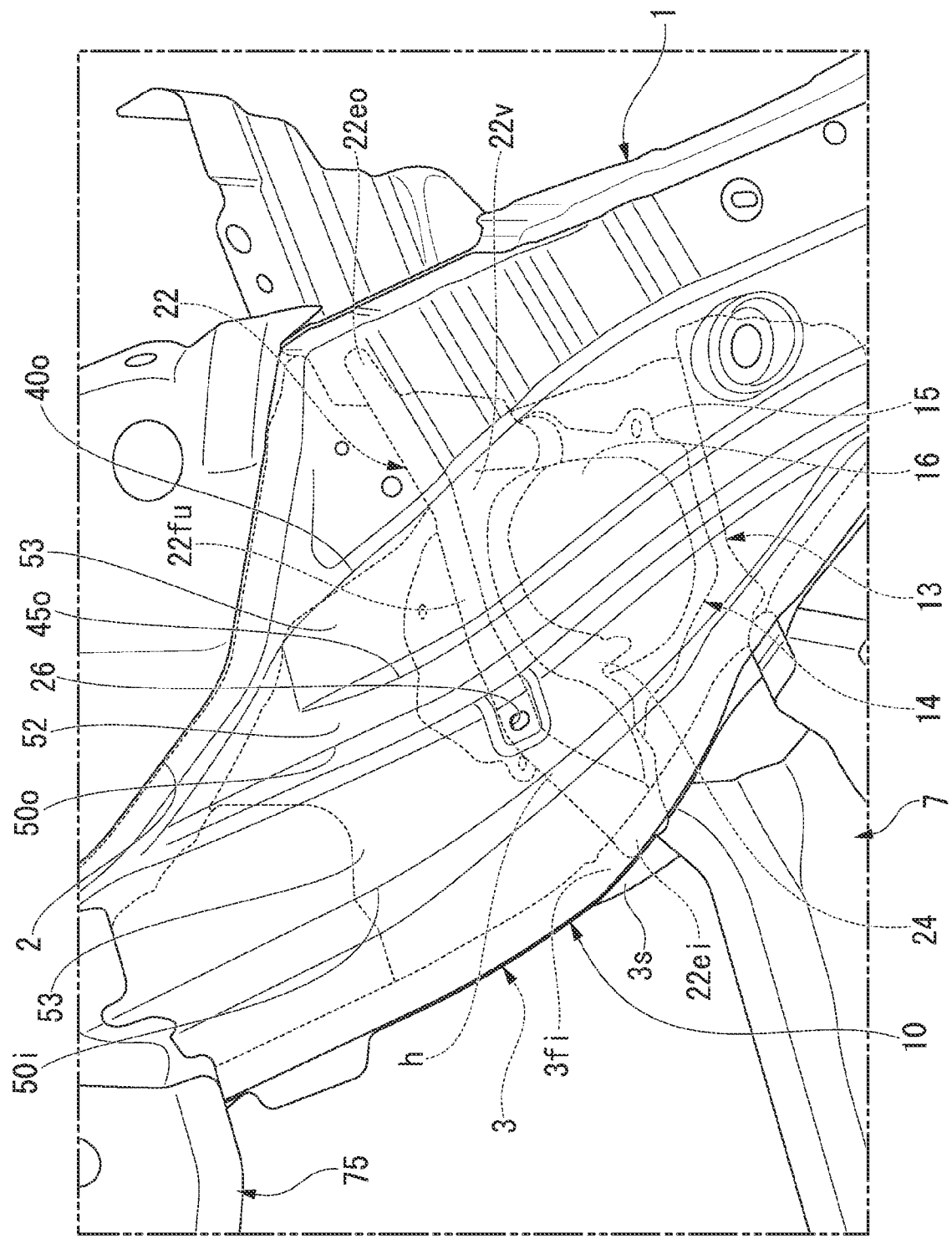
FIG. 2 is a perspective view of the vehicle body rear part according to the embodiment.
Figure 3:
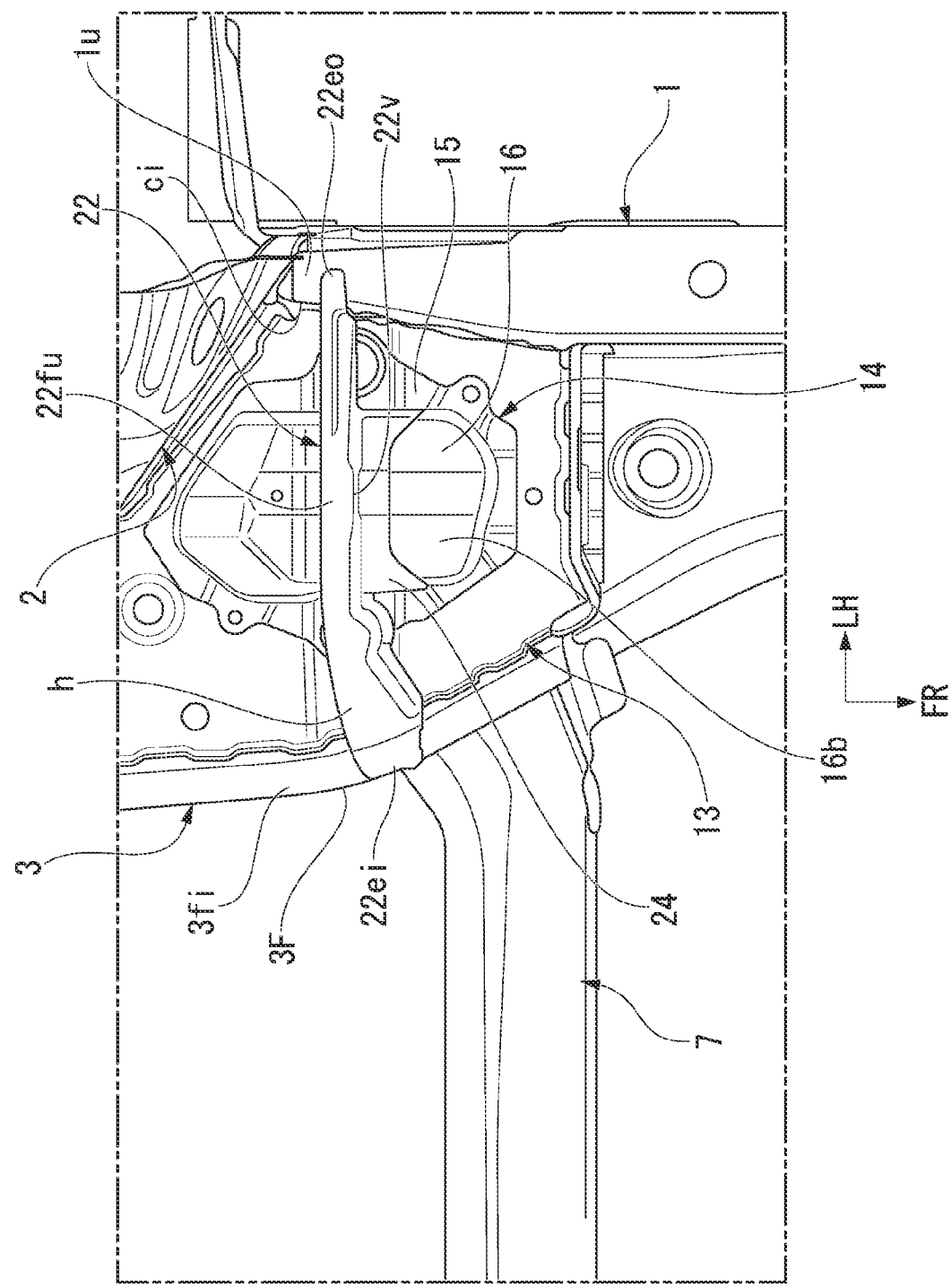
FIG. 3 is a plan view of the vehicle body rear part from which part of components are removed according to the embodiment.
Figure 4:
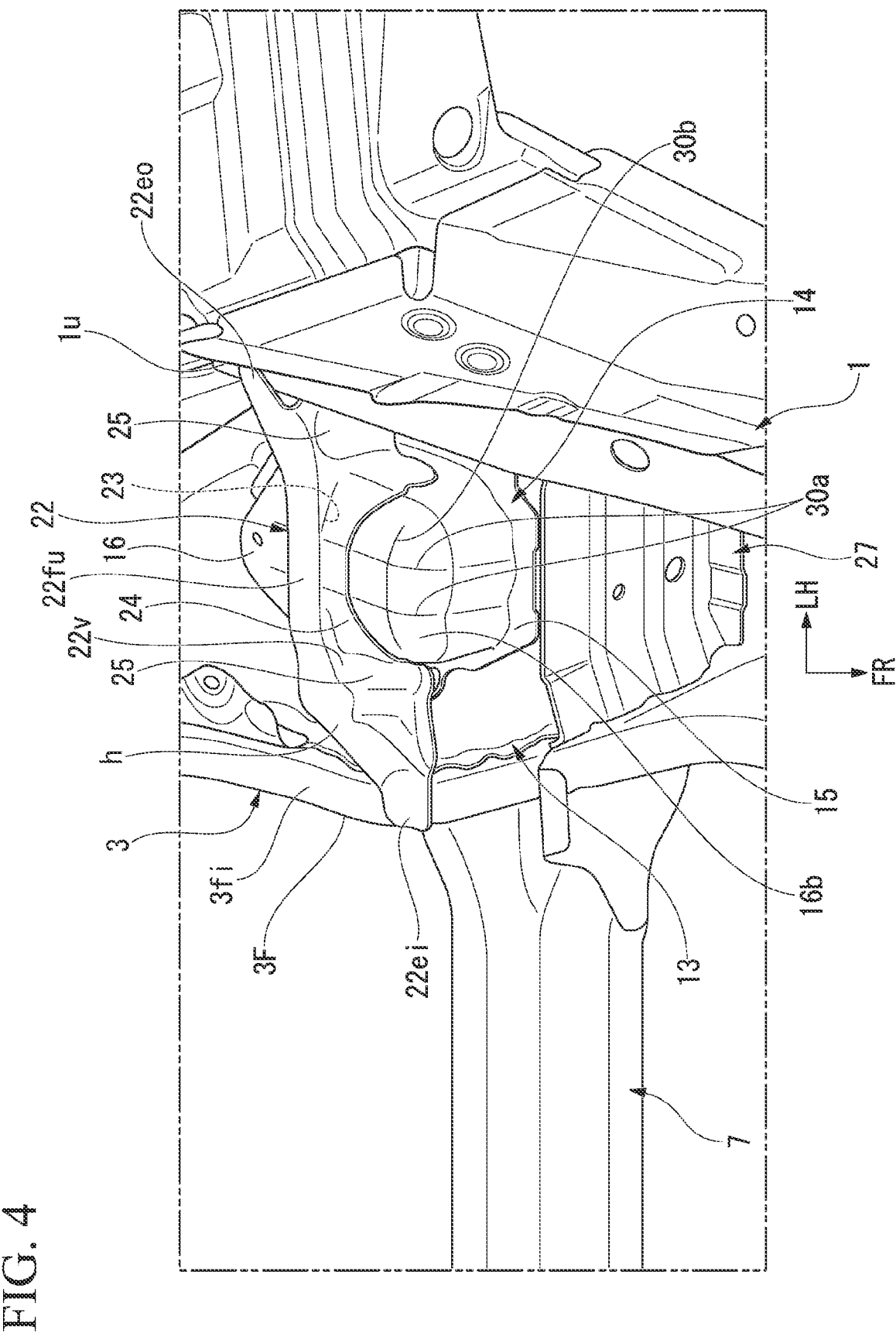
FIG. 4 is a perspective view of the vehicle body rear part from which part of components are removed according to the embodiment.
Figure 5:
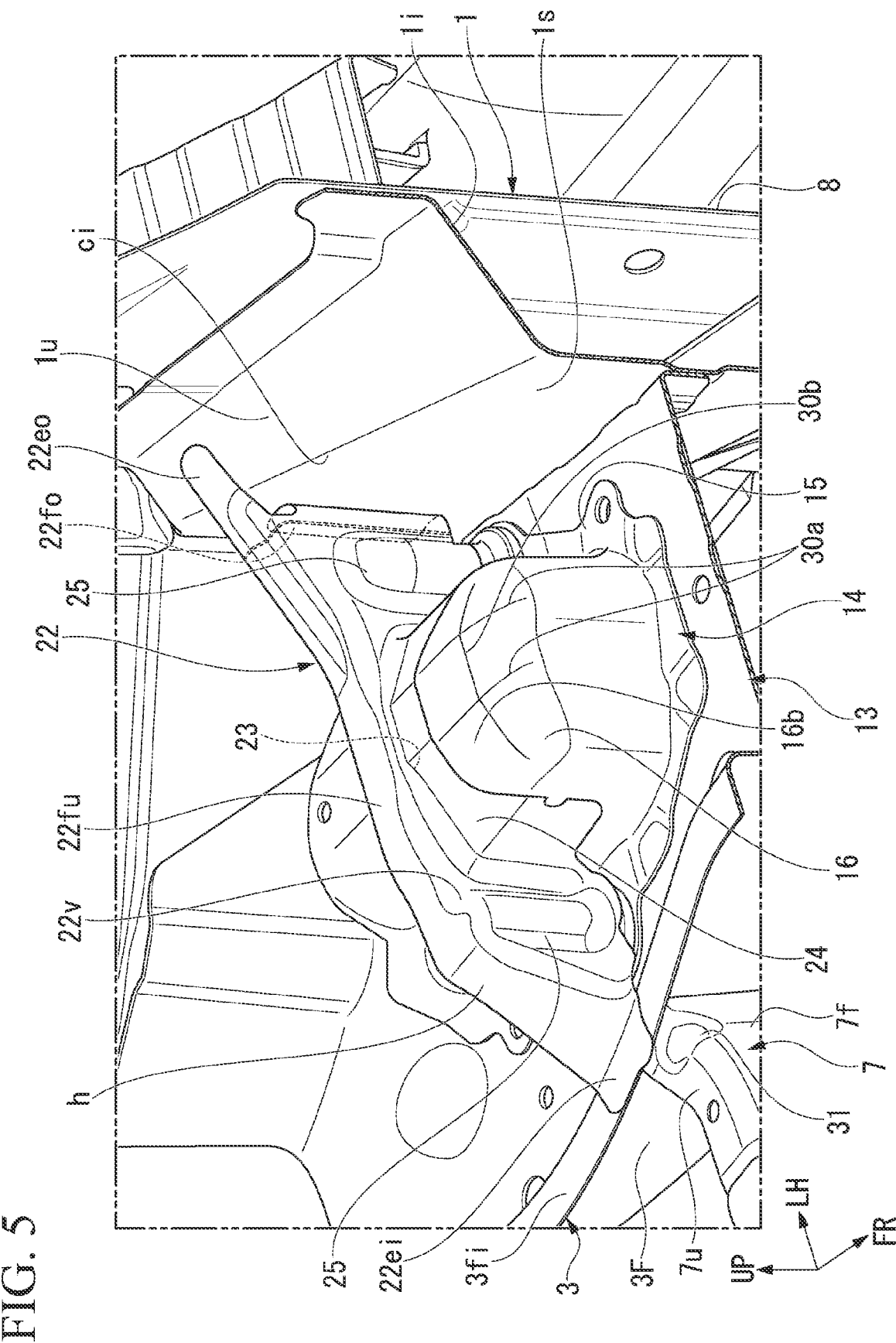
FIG. 5 is another perspective view of the vehicle body rear part from which part of components are removed according to the embodiment.

FIG. 1 is a plan view showing a left frame portion of a vehicle body rear part of a vehicle according to the present embodiment. FIG. 2 is a perspective view of the same left frame portion as that in FIG. 1 when seen from a forward rightward and obliquely upward direction. FIG. 3 is a plan view in which part (a close plate 10) of components is removed from the same left frame portion as that in FIG. 1. FIG. 4 and FIG. 5 are perspective views in which part (the close plate 10) of components are removed from the same left frame portion as that in FIG. 1. FIG. 4 and FIG. 5 are views of the same left frame portion when seen from different angles.

A right frame portion of the vehicle body rear part is formed in a symmetrical shape with the left frame portion with respect to the center line in a width direction of the vehicle. Therefore, only the left frame portion will be described in the following description, and description of the right frame portion will be omitted.

Reference numeral 1 in the drawings represents a side sill that is disposed below a side part of a passenger compartment substantially in a vehicle forward/rearward direction. Reference numeral 2 represents a rear wheelhouse (refer to FIG. 1 and FIG. 2) that covers the surroundings on an upper side of a rear wheel (not shown) at a rear side of the side sill 1. A rear side frame 3 that extends forward from a vehicle rear part is disposed on an inner side in a vehicle width direction of the rear wheelhouse 2. A horizontal cross section of a front part of the rear wheelhouse 2 is formed to be curved so as to cover the rear wheel continuously from an inner end surface in the vehicle width direction of the rear wheel to a front surface side of the rear wheel. A main part of the rear side frame 3 is formed in a cross-sectional shape having a substantially C shape that opens to an upper side. The close plate 10 having substantially the same shape as a plan view shape of the rear side frame 3 is joined to an upper part of the rear side frame 3. The close plate 10 closes an opening on an upper side of the rear side frame 3.

A front region 3F of the rear side frame 3 curves outward in the vehicle width direction along a curve shape (a curve shape in a horizontal cross section) of the front part of the rear wheelhouse 2, is then turned again to a vehicle forward side, and is joined to an inner portion in the vehicle width direction of the rear part of the side sill 1. More specifically, as shown in FIG. 1, an outer curve part 40$o$ having an outer side wall in the vehicle width direction that curves outward in the vehicle width direction substantially along a shape (a shape in a horizontal cross section) of a front part of the rear wheel house 2 and an inner curve part 40$i$ having an inner side wall in the vehicle width direction that curves outward in the vehicle width direction substantially along a shape (a shape in a horizontal cross section) of the front part of the rear wheel house 2 are provided in a region close to the front part of the rear wheel house 2 of the rear side frame 3.

The outer curve part 40$o$ is defined as a plan view shape that is curved in a substantially S shape so as to continue from the curve shape of the front part of the rear wheelhouse 2 to an inner side surface in the vehicle width direction of side sill 1. On the other hand, the inner curve part 40$i$ is defined as a plan view shape having an arc shape that greatly surrounds an area from the front part of the rear wheelhouse 2 to a rear region of the side sill 1. Accordingly, with respect to a width (a width in the vehicle width direction) of the front region 3F of the rear side frame 3, a part close to the rear part of the side sill 1 gradually increases toward the forward side due to the difference in the curve shape between the outer curve part 40$o$ and the inner curve part 40$i$. The width (the width in the vehicle width direction) on the front-end side of the rear side frame 3 that becomes substantially parallel to the side sill 1 gradually decreases toward the forward side.

Figure 6:
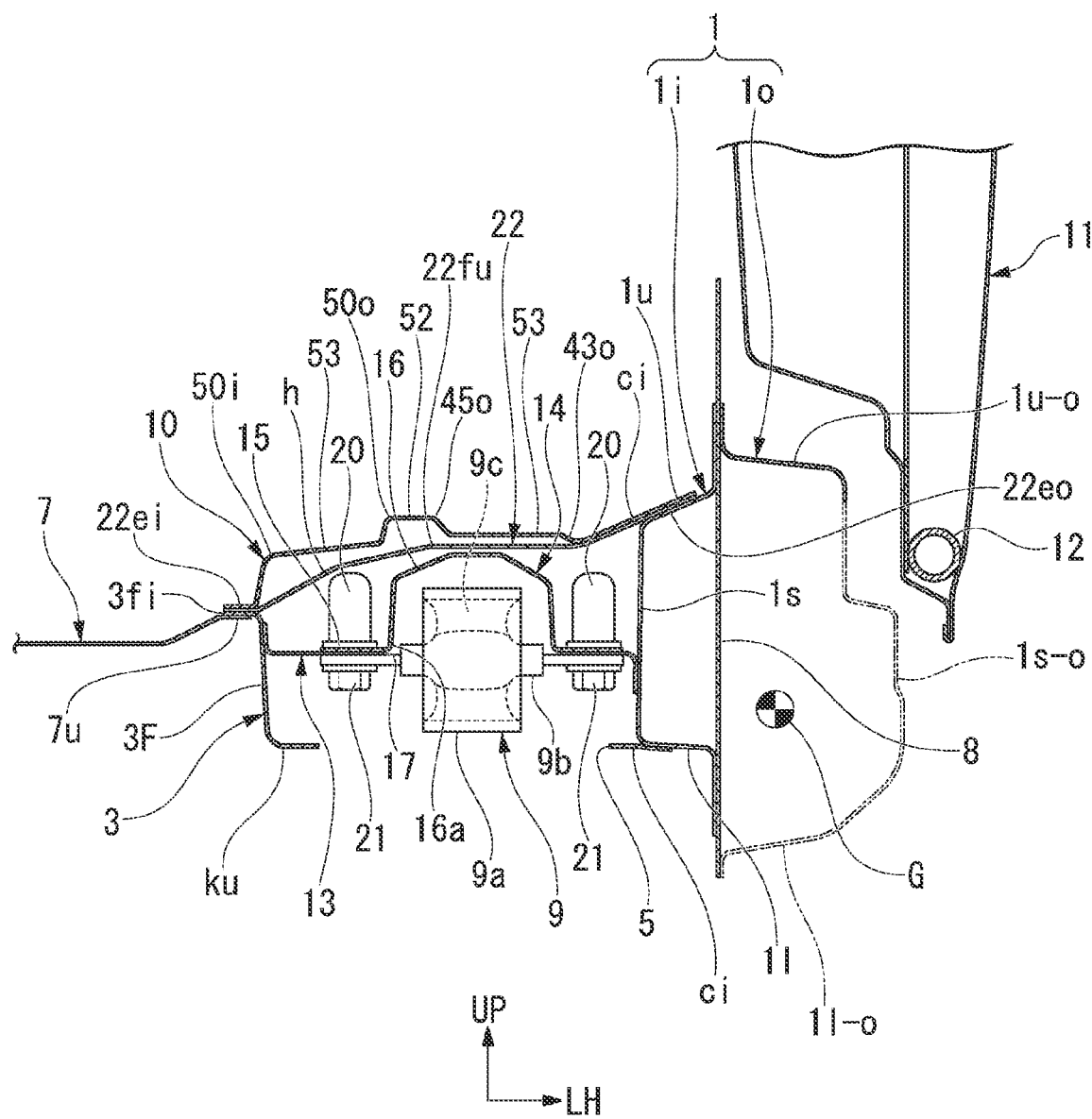
FIG. 6 is a cross sectional view of the vehicle body rear part along a line VI-VI of FIG. 1 according to the embodiment.
Figure 7:
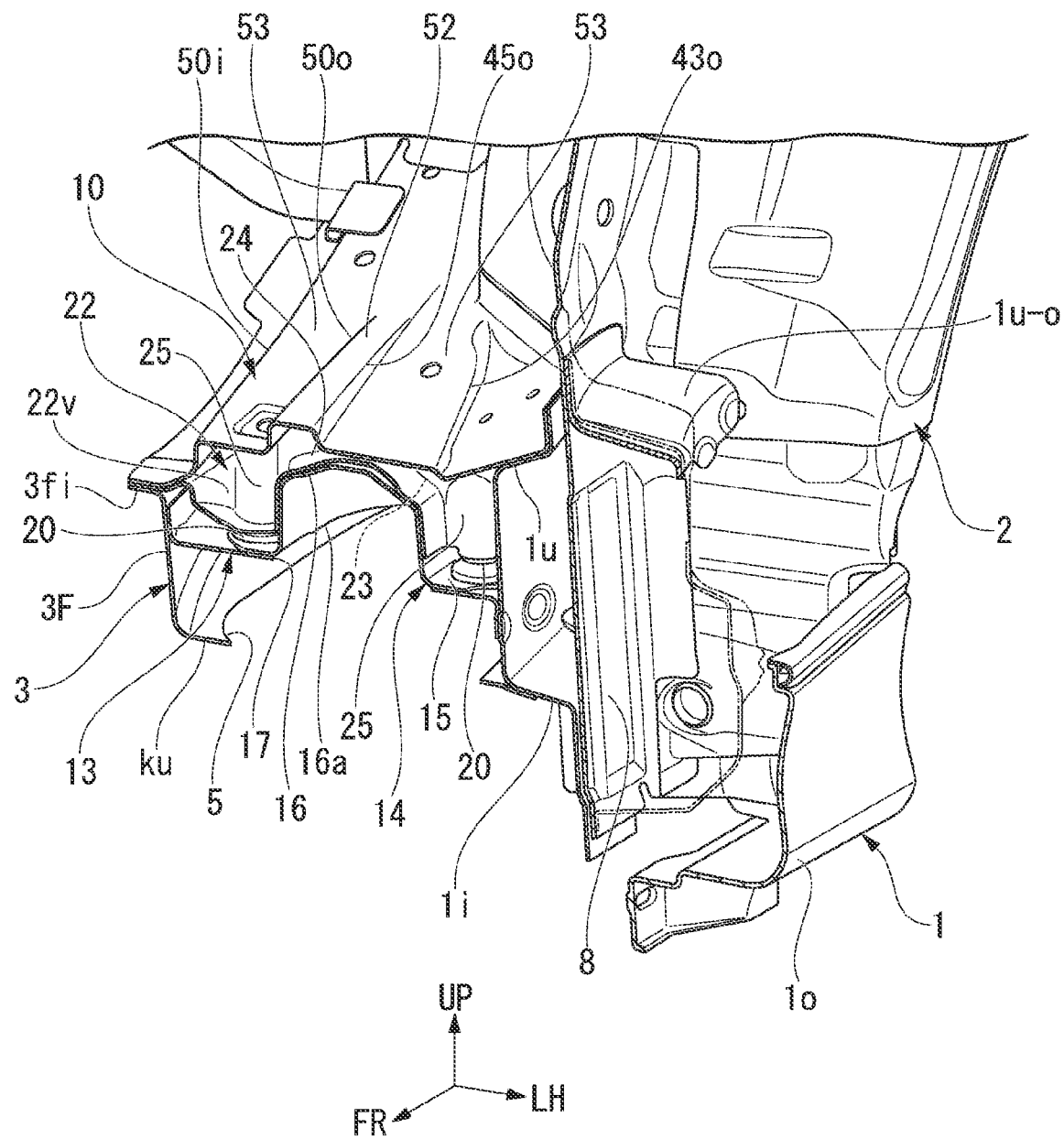
FIG. 7 is a partial cross sectional perspective view of the vehicle body rear part according to the embodiment, part of which is in a cross section along the line VI-VI of FIG. 1.
Figure 8:
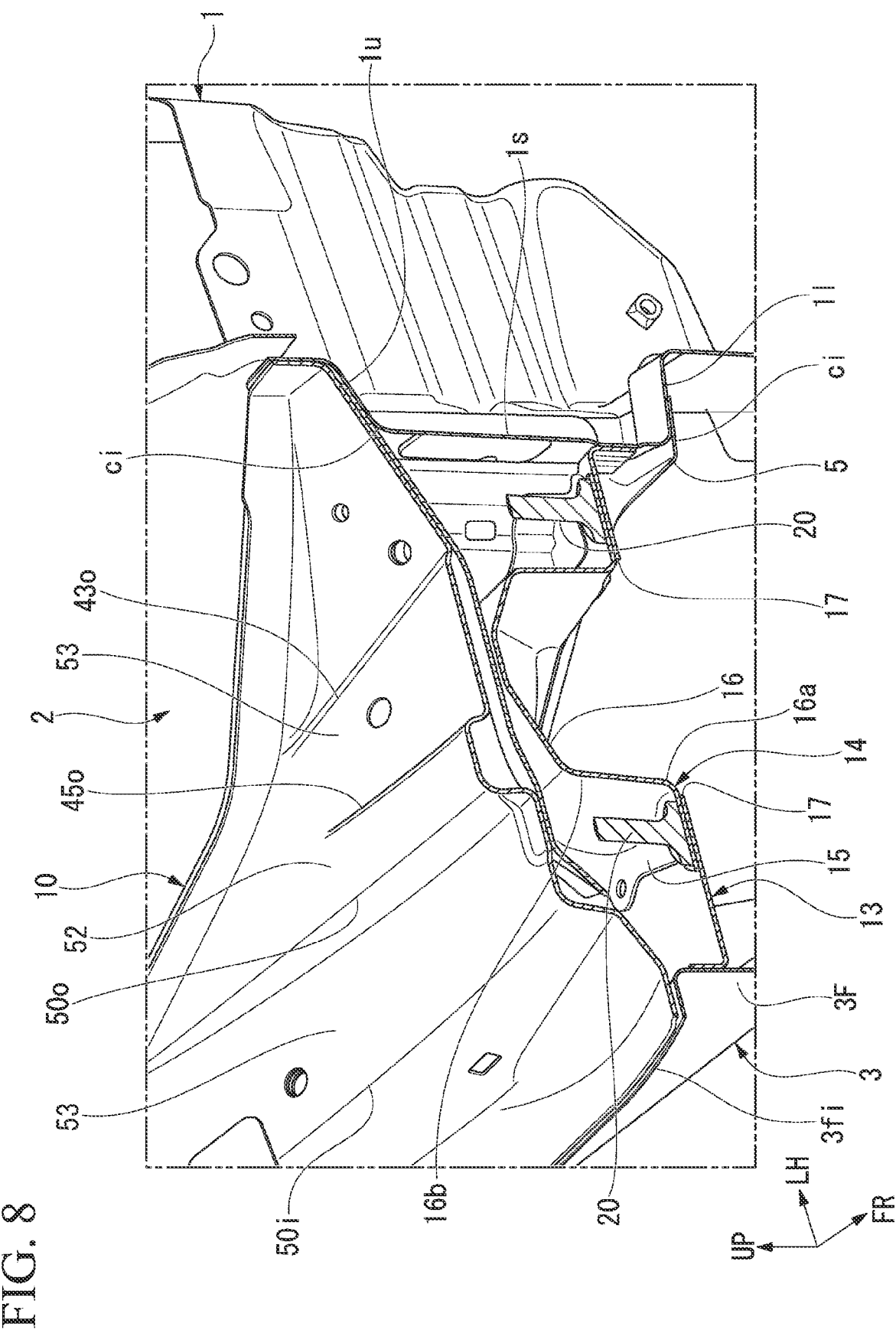
FIG. 8 is a partial cross sectional perspective view of the vehicle body rear part according to the embodiment, part of which is in a cross section along a line VIII-VIII of FIG. 1.
Figure 9:
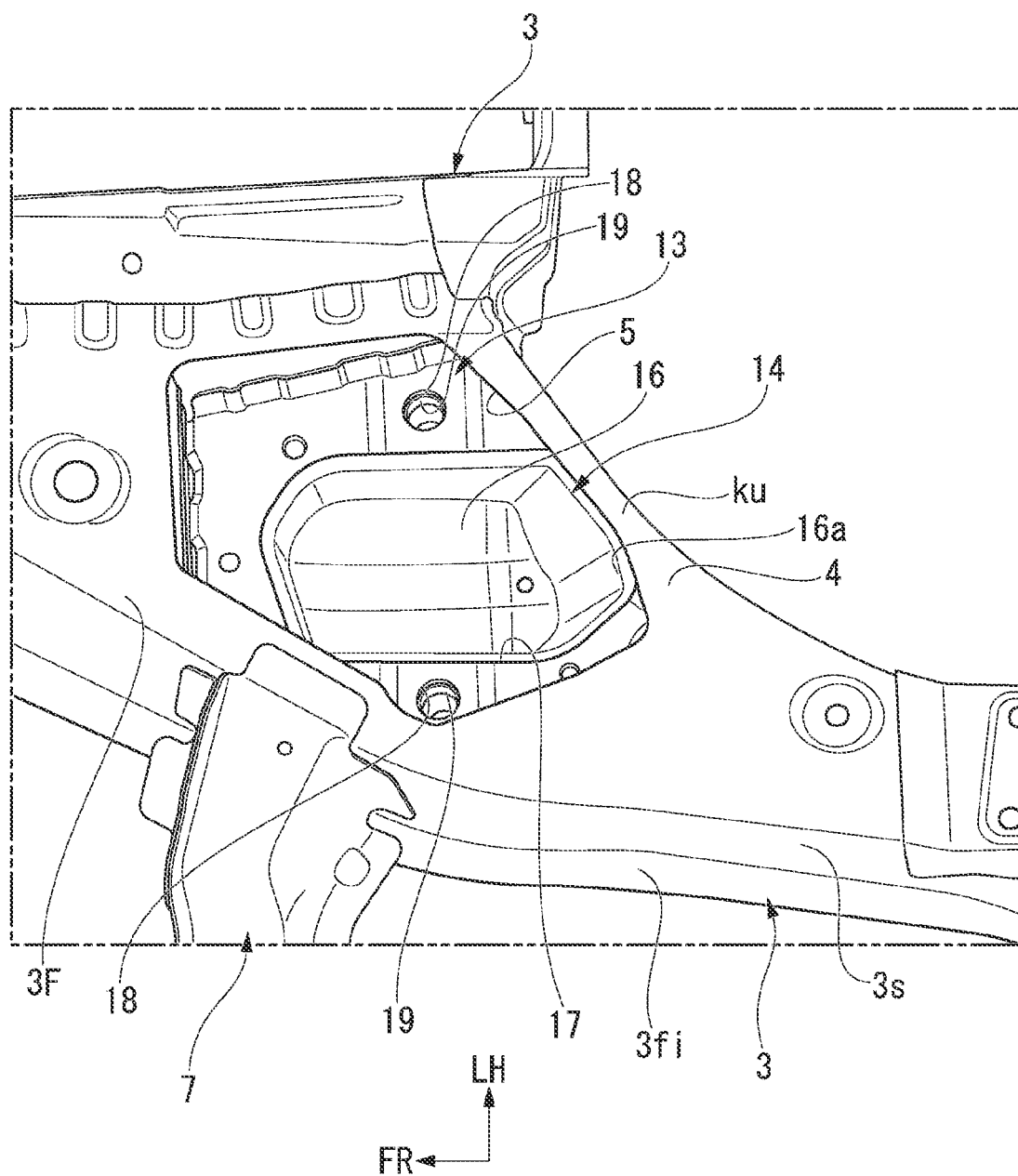
FIG. 9 is a view of the vehicle body rear part when seen from below according to the embodiment.

FIG. 6 is a cross sectional view along a line VI-VI of FIG. 1. FIG. 7 is a partial cross sectional perspective view of the left frame portion of the vehicle body rear part, part of which is in a cross section along the line VI-VI of FIG. 1. FIG. 8 is a partial cross sectional perspective view of the left frame portion of the vehicle body rear part, part of which is in a cross section along a line VIII-VIII of FIG. 1. FIG. 9 is a view showing the left frame portion of the vehicle body rear part when seen from below.

Part of the front region 3F of the rear side frame 3 that is curved in a plan view is a kick-up part ku that is inclined upward toward a vehicle rearward side. The rear side of the kick-up part ku of the rear side frame 3 extends substantially horizontally toward the vehicle rearward side. As shown in FIG. 6, FIG. 7 and FIG. 9, an arm insertion hole 5 is formed on a lower wall 4 of the kick-up part ku. The vehicle of the present embodiment employs a trailing arm type rear wheel suspension apparatus. A trailing arm (not shown) of the rear wheel suspension apparatus supports the rear wheel at a rear end side, and a front-end side is inserted through the arm insertion hole 5 of the kick-up part ku. As shown in FIG. 6, a front-end part of the trailing arm is swingably supported inside the cross section of the front region 3F (the kick-up part ku) of the rear side frame 3 via a mount member 9 having a cylindrical shape in which a rubber elastic body 9$c$ is installed.

As shown in FIG. 1 and FIG. 2, a first cross member 6 that extends substantially in the vehicle width direction and that has both end parts which are connected to the right and left side sills 1 is disposed in front of a front-end part of the rear side frame 3. The front regions 3F (the kick-up parts ku) of the right and left rear side frames 3 are connected to each other by a second cross member 7 (a cross member) that extends substantially in the vehicle width direction. Further, rear regions of the right and left rear side frames 3 are connected to each other by a third cross member 75 that extends substantially in the vehicle width direction.

As shown in FIG. 6 and FIG. 7, in the side sill 1, an inner side sill 1$i$ and an outer side sill 1$o$ having a substantially hat shape and including upper and lower joint flanges are joined to each other by the upper and lower joint flanges.

A stiffener 8 that crosses a cross section that is formed of the inner side sill 1$i$ and the outer side sill 1$o$ is interposed between the joint flanges of the inner side sill 1$i$ and the outer side sill 1$o$.

An inner angle part ci is disposed on the inner side sill 1$i$ at upper and lower positions of a side wall 1$s$. An upper wall 1$u$ of the inner side sill 1$i$ extends outward in the vehicle width direction from an upper inner angle part ci. A lower wall 1$l$ of the inner side sill 1$i$ extends outward in the vehicle width direction from a lower inner angle part ci.

The outer side sill 1$o$ includes an upper wall 1$u$-$o$ that is inclined moderately downward and extends outward in the vehicle width direction from the upper joint flange. An outer side wall 1$s$-$o$ in the vehicle width direction and a lower wall 1$l$-$o$ are continuously provided on an outer end part in the vehicle width direction of the upper wall 1$u$-$o$. However, in a cross-sectional part shown in FIG. 6 and FIG. 7, the side wall 1s-o and the lower wall 1l-o are partially cut out. Reference numeral G in FIG. 6 represents the center of gravity of the side sill 1.

A lower edge part of a side door 11 on a rear side is disposed to partially overlap the side sill 1 on an outer side in the vehicle width direction of the side sill 1. A door beam 12 is installed in the lower edge part of the side door 11. The door beam 12 is a pipe member made of metal that extends substantially horizontally in the vehicle forward/rearward direction. The door beam 12 receives an impact load while preventing excessive deformation of a panel member of the side door 11 when the impact load is input to the side door 11 from the outside in the vehicle width direction. The door beam 12 is disposed on the lower edge part of the side door 11 at a position above the center of gravity G of the side sill 1 that overlaps the upper region of the outer side sill 1o.

A bracket support plate 13 made of metal that extends in the vehicle forward/rearward direction and the vehicle width direction is fixed to the inside of the cross section of the kick-up part ku of the front region 3F of the rear side frame 3. An arm attachment bracket 14 made of metal that supports the mount member 9 is fixed to an upper surface of the bracket support plate 13. The arm attachment bracket 14 includes: a flat base part 15 that is joined to the bracket support plate 13; and a dome-shaped part 16 that bulges to be curved upward from the center region of the base part 15. As shown in FIG. 9, a communication port 17 that causes an opening 16a which faces downward of the dome-shaped part 16 of the arm attachment bracket 14 to communicate with the arm insertion hole 5 of the rear side frame 3 is provided on the bracket support plate 13. Bolt insertion holes 18 and 19 (refer to FIG. 9) that penetrate in a vertical direction are formed at corresponding positions of the base part 15 of the arm attachment bracket 14 and right and left side edge parts of the communication port 17 of the bracket support plate 13, respectively. A fixation nut 20 (a collar nut) is attached to upper surfaces of right and left edge portions of the base part 15 of the arm attachment bracket 14 through welding or the like.

As shown in FIG. 6, in the mount member 9, a shaft part 9b is disposed at an axis center position of a cylinder part 9a, and the cylinder part 9a and the shaft part 9b are connected together by the rubber elastic body 9c. End portions on both sides of the shaft part 9b that penetrates through the cylinder part 9a are fixed to the arm attachment bracket 14 by a bolt 21. More specifically, both end portions of the shaft part 9b of the mount member 9 are formed to be flat, and a bolt insertion hole (not shown) is formed on the flat portion. Then, a shaft part of the bolt 21 penetrates through bolt insertion holes of the shaft part 9b, the bracket support plate 13, and the arm attachment bracket 14 and is fastened to the corresponding fixation nut 20 of an upper part of the arm attachment bracket 14. Thereby, the mount member 9 is fixed to the inside of the cross section of the front region 3F of the rear side frame 3.

As shown in FIG. 3 to FIG. 5, a bracket reinforcement member 22 is integrally attached to an upper surface side of the arm attachment bracket 14. The bracket reinforcement member 22 is formed of a plate member made of metal. The bracket reinforcement member 22 is a plate member having a substantially L-shaped cross section and including: a vertical stand wall 22v having a substantially right triangle shape in a front view having an oblique side h that is inclined downward toward an inside from an outside in the vehicle width direction; and an upper end bend flange 22fu that extends to be bent at a substantially right angle to the vehicle rearward side from an upper end part of the vertical stand wall 22v. The bracket reinforcement member 22 is fixed to the arm attachment bracket 14 such that a longitudinal direction of the vertical stand wall 22v is directed in the vehicle width direction.

As shown in FIG. 5, an outer flange 22fo that is curved at a substantially right angle to the vehicle rearward side and is fixed to the side wall is (an inner surface in the vehicle width direction of the side sill 1) of the inner side sill 1i of the side sill 1 is provided to extend on an outer end part in the vehicle width direction of the vertical stand wall 22v of the bracket reinforcement member 22. An outer extension wall 22eo that is joined to an upper surface of the upper wall 1u of the inner side sill 1i of the side sill 1 is provided to extend on an outer end part in the vehicle width direction of the upper end bend flange 22fu of the bracket reinforcement member 22.

In the front region 3F of the rear side frame 3, an inner flange 3fi that extends inward in the vehicle width direction is provided on an upper end part of an inner side wall in the vehicle width direction that constitutes a C-shaped cross section facing upward. An inner extension wall 22ei that is joined to an upper surface of the inner flange 3fi of the rear side frame 3 is provided to extend on an inner end part in the vehicle width direction of the upper end bend flange 22fu of the bracket reinforcement member 22. A front flange part 7u (an upper wall) on the outside in the vehicle width direction of the second cross member 7 is overlapped with a lower surface of the inner flange 3fi of the rear side frame 3. The front flange part 7u of the second cross member 7, the inner flange 3fi of the rear side frame 3, and the inner extension wall 22ei of the bracket reinforcement member 22 are welded and fixed in a state of three layers.

In the bracket reinforcement member 22, an outer end part in the vehicle width direction is joined to the vicinity (the upper wall 1u) of the inner angle part ci above the side sill 1 by the outer extension wall 22eo of the upper end bend flange 22fu. In the bracket reinforcement member 22, an inner end part in the vehicle width direction is joined to an outer end part in the vehicle width direction of the second cross member 7 and the inner flange 3fi of the rear side frame 3 by the inner extension wall 22ei of the upper end bend flange 22fu.

As shown in FIG. 6, the bracket reinforcement member 22 is disposed above the center of gravity G of the side sill 1 in this state.

The vertical stand wall 22v of the bracket reinforcement member 22 includes a recess part 23 that is fitted to an outer surface 16b of the dome-shaped part 16 of the arm attachment bracket 14. The recess part 23 is formed to be recessed in a substantially arc shape to an upper side from a lower edge of a substantially middle part in the vehicle width direction of the vertical stand wall 22v. A lower side bend flange 24 that is joined to the outer surface 16b of the dome-shaped part 16 is formed on an edge portion of the recess part 23. The lower side bend flange 24 is bent toward a vehicle forward side along the outer surface 16b of the dome-shaped part 16. The lower side bend flange 24 is overlapped with the outer surface 16b of the dome-shaped part 16 and is fixed to the outer surface 16b through welding or the like.

As shown in FIG. 4 and FIG. 5, a longitudinal ridge line 30a along the vehicle forward/rearward direction and a lateral ridge line 30b along the vehicle width direction are provided near a top portion of the dome-shaped part 16. The rigidity of the dome-shaped part 16 is enhanced by the longitudinal ridge line 30a and the lateral ridge line 30b.

Only any one of the longitudinal ridge line 30a and the lateral ridge line 30b may be provided, and the number of ridge lines 30a and 30b is arbitrary.

A nut reception part 25 having an arc-shaped cross section that extends along the vertical direction is provided on both right and left side portions of the recess part 23 in the vertical stand wall 22v of the bracket reinforcement member 22. An outer surface of the fixation nut 20 that is attached to an upper surface of the arm attachment bracket 14 is integrally fixed to the nut reception part 25 through welding or the like.

The close plate 10 that closes the rear side frame 3 from above is fixed to an upper part of the bracket reinforcement member 22 that is fixed to the inside of the cross section of the front region 3F of the rear side frame 3 together with the arm attachment bracket 14. Specifically, the close plate 10 is overlapped with part of the upper surface of the upper end bend flange 22fu of the bracket reinforcement member 22, and the overlapped parts are joined together through welding.

When joining the close plate 10 and the upper end bend flange 22fu, for example, as shown in FIG. 2, a penetration hole 26 is formed on part of the close plate 10 to be overlapped with the upper surface of the upper end bend flange 22fu, and a circumferential edge part of the penetration hole 26 and an upper surface of the upper end bend flange 22fu can be fixed through the penetration hole 26 by mig welding or the like. As a result, the upper end bend flange 22fu of the bracket reinforcement member 22 is joined to the close plate 10 via a weld material.

In the close plate 10 that closes the rear side frame 3 from above, an inner edge part in the vehicle width direction is joined to the inner flange 3fi of the rear side frame 3. In the close plate 10 that closes the rear side frame 3 from above, an outer edge part in the vehicle width direction is joined to an outer flange (not shown) of the rear side frame 3 and the upper wall 1u of the inner side sill 1i. As shown in FIG. 1, a front edge part of the close plate 10 is joined to the upper surface of the first cross member 6 that connects together the right and left side sills 1 in front of the rear side frame 3.

As shown in FIG. 1 and FIG. 2, an outer ridge line 50o that extends straight in a vehicle forward direction from a position substantially directly above the vicinity of a rear end portion of the outer curve part 40o of the rear side frame 3 and an inner ridge line 50i that extends to be curved to a vehicle forward side substantially along the inner curve part 40i at a position substantially directly above the inner curve part 40i of the rear side frame 3 are formed on the close plate 10. The outer ridge line 50o and the inner ridge line 50i converge in an inner region in the vehicle width direction of a joint part of the side sill 1 and the rear side frame 3 on a front end side of the close plate 10. Further, a first auxiliary outer ridge line 43o that extends to be curved to the vehicle forward side along the outer curve part 40o is provided on the close plate 10 at a position in the outer curve part 40o of the rear side frame 3 directly above a further outer region in the vehicle width direction than the vicinity of the rear end portion of the outer curve part 40o. Further, a second auxiliary outer ridge line 45o that extends straight in a vehicle forward direction in parallel with the outer ridge line 50o is provided on the close plate 10 at a position close to the outside in the vehicle width direction of the outer ridge line 50o.

As shown in FIG. 6 to FIG. 8, in a front side region of the close plate 10, an outer end part in the vehicle width direction is joined to the upper wall 1u on an inside in the vehicle width direction of the side sill 1, and an inner end part in the vehicle width direction is joined to the inner flange 3fi of the rear side frame 3.

The inner ridge line 50i and the first auxiliary outer ridge line 43o are positioned on an upper side relative to end parts on both sides in the vehicle width direction of the close plate 10, and a side wall and an upper wall that are in contact with the ridge lines 50i and 43o form a cross sectional shape that is raised upward. The cross-sectional shape that is raised upward extends substantially along a vehicle forward/rearward direction and forms a second reinforcement bead 53 having a wide width in the vehicle width direction.

Further, the outer ridge line 50o and the second auxiliary outer ridge line 45o are positioned at a further upper side relative to the first auxiliary outer ridge line 43o and the inner ridge line 50i on the close plate 10, and a side wall and an upper wall that are in contact with the ridge lines 50o and 43o form a cross sectional shape that is raised upward. The cross-sectional shape that is raised upward extends substantially along a vehicle forward/rearward direction and forms a first reinforcement bead 52 having a narrow width in the vehicle width direction. Accordingly, the close plate 10 is formed in a multistage form in which the first reinforcement bead 52 having a narrow width that extends substantially along the vehicle forward/rearward direction is on the second reinforcement bead 53 having a wide width that extends substantially along the vehicle forward/rearward direction.

In the present embodiment, the rear end part of the second auxiliary outer ridge line 45o does not reach the curved first auxiliary outer ridge line 43o; however, the second auxiliary outer ridge line 45o can be constituted to extend to a vehicle forward side from the first auxiliary outer ridge line 43o.

Further, as shown in FIG. 6, the upper wall 1u-o of the outer side sill 1o faces an outer upper end part in the vehicle width direction of the bracket reinforcement member 22 that is disposed in the inside of the cross section of the front region 3F of the rear side frame 3 so as to sandwich the stiffener 8 of the side sill 1. The upper wall 1u-o of the outer side sill 1o is moderately inclined downward toward the outside in the vehicle width direction as described above, and an outer end part in the vehicle width direction faces the door beam 12 in the side door 11.

In the present embodiment, the upper wall 1u-o that is disposed to be inclined downward toward the outside in the vehicle width direction constitutes a load transmission part in the cross section of the side sill 1 that transmits an impact load to the bracket reinforcement member 22 when the impact load is input to the door beam 12 from the outside in the vehicle width direction.

Further, as shown in FIG. 4, a bulkhead 27 that extends downward from a front edge part of the bracket support plate 13 that is fixed to the inside of the cross section of the front region 3F of the rear side frame 3 is joined to the front edge part. The bulkhead 27 extends in the vehicle width direction and the vertical direction in the cross section of the front region 3F of the rear side frame 3 and is joined to the cross section of the front region 3F of the rear side frame 3 and the side wall of the side sill 1. The bulkhead 27 reinforces the cross section of the front region 3F in the front region 3F of the rear side frame 3 and rigidly joins the lower side of the front region 3F to a side surface of the side sill 1.

Figure 10:
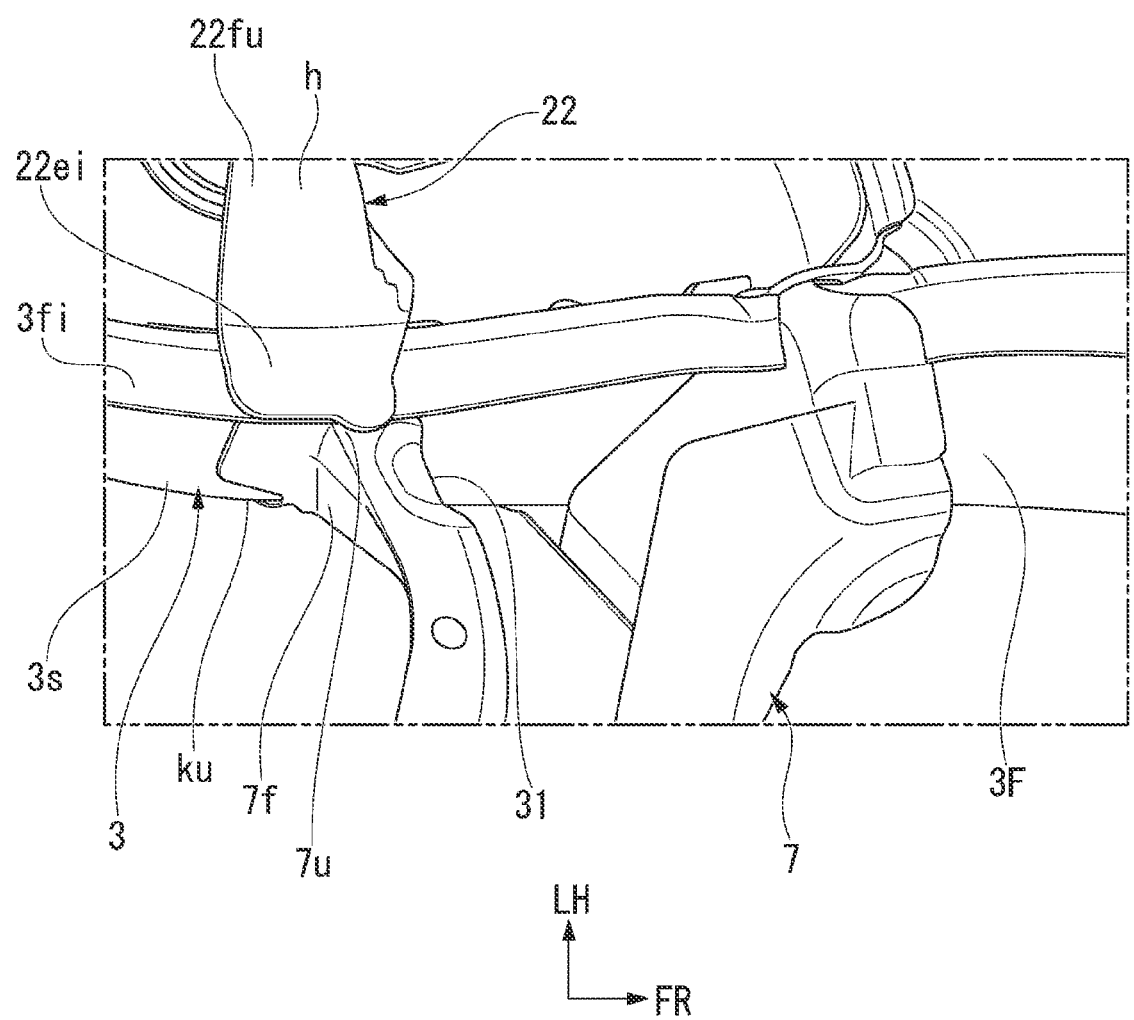
FIG. 10 is a perspective view of a joint part of a second cross member and a rear side frame of the vehicle body rear part when seen from an upper side according to the embodiment.

FIG. 10 is a perspective view showing a joint part of the second cross member 7 and the rear side frame 3 when seen from an upper side.

As shown in FIG. 10, the second cross member 7 is formed in a cross-sectional shape of a substantially hat shape that opens to an upper side. In the outer end region in the vehicle width direction of the second cross member 7, a front wall 7f and the front flange part 7u that extends to be bent to a forward side from the upper end part of the front wall 7f extend to be moderately curved toward the outside in the vehicle width direction. Outer end portions in the vehicle width direction of the front wall 7f and the front flange part 7u butt an inner side wall 3s in the vehicle width direction of the curved rear side frame 3 in a state of being perpendicular to the side wall 3s. The front wall 7f and the front flange part 7u are welded and fixed to an inner surface in the vehicle width direction of the side wall 3s of the rear side frame 3 and a lower surface of the inner flange 3fi. As described above, the front flange part 7u is welded and fixed to the inner flange 3fi of the rear side frame 3 and the inner extension wall 22ei of the bracket reinforcement member 22 in a state of three layers.

A depression part 31 is formed to bridge the front wall 7f and the front flange part 7u in the vicinity of outer end parts in the vehicle width direction of the front flange part 7u and the front wall 7f of the second cross member 7. The depression part 31 is a fragile portion (a fragile part) against an input load along an extension direction of the second cross member 7 and induces a buckling distortion of the second cross member 7 when an impact load along the extension direction is input to the second cross member 7.

Figure 11:
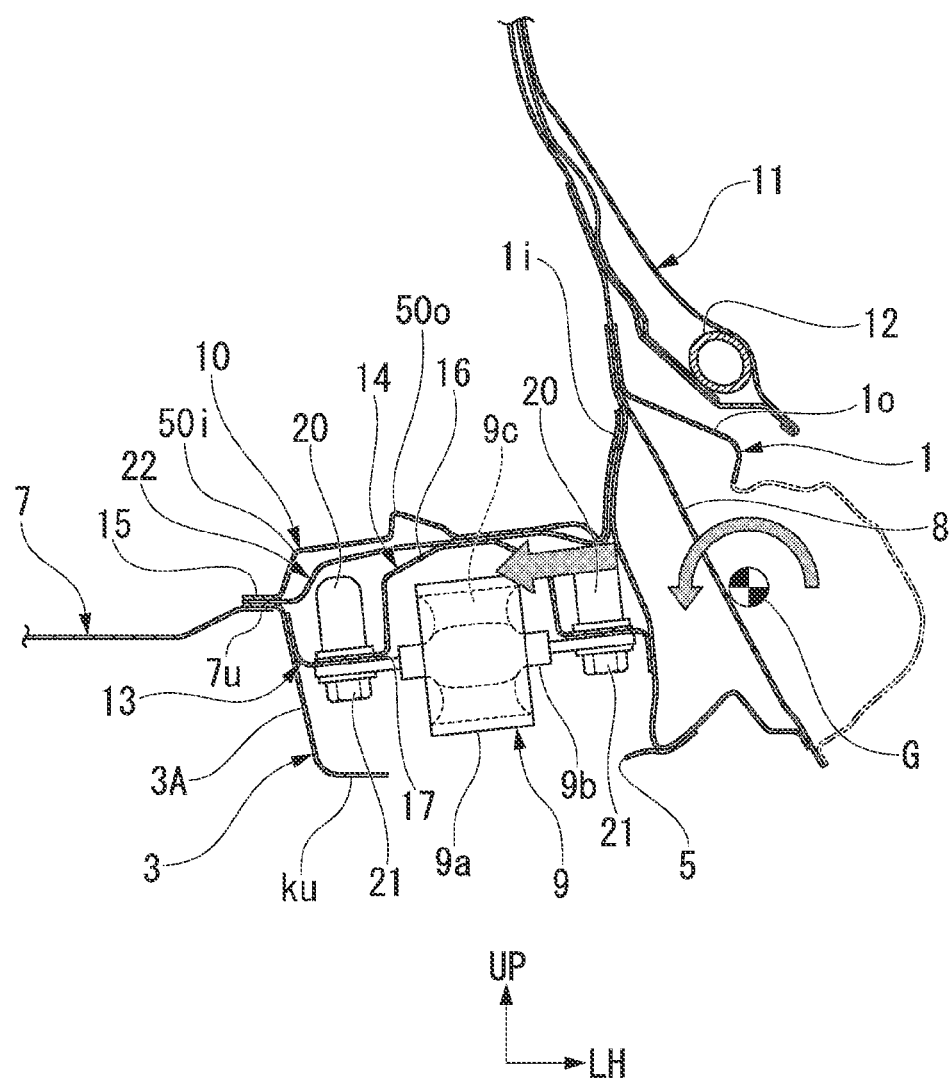
FIG. 11 is a cross sectional view similar to FIG. 6 showing a deformation behavior of the vehicle body rear part when an impact load is input according to the embodiment.

FIG. 11 is a cross sectional view similar to FIG. 6 showing a deformation behavior of the vehicle body rear part when an impact load toward an inside in the vehicle width direction is input to an outside of the side door 11 on the rear side.

As shown in FIG. 11, when the impact load toward the inside in the vehicle width direction is input to the outside of the side door 11, the impact load is transmitted to the side sill 1 from the door beam 12 in the side door 11 and is further transmitted from the side sill 1 to the second cross member 7 through the bracket reinforcement member 22 that crosses the front region 3F of the rear side frame 3 in the vehicle width direction. Therefore, the impact load that is input to the side door 11 is efficiently transmitted to the second cross member 7 through the bracket reinforcement member 22.

Further, since the door beam 12 in the side door 11 is displaced to an upper side relative to the center of gravity G of the side sill 1, the impact load that is input to the side sill 1 from the door beam 12 applies a moment as indicated by an arrow in FIG. 11 to the surroundings of the axis center (the center of gravity G) of the side sill 1. However, in the vehicle body rear part structure of the present embodiment, since the inner angle part ci on a further upper side than the center of gravity G of the side sill 1 is connected to an outer end part in the vehicle width direction of the second cross member 7 via the bracket reinforcement member 22, it is possible to efficiently receive the moment by the bracket reinforcement member 22. As a result, the collapse of the upper part of the side door 11 to a vehicle inside is prevented.

Further, when a stress in the vehicle width direction is applied to the trailing arm at the time of rapid turning of the vehicle or the like, the stress is strongly supported by the second cross member 7 and the side sill 1 via the bracket reinforcement member 22 and the fixation nut 20 of the arm attachment bracket 14 that fastens and fixes the mount member 9.

Further, when a stress in the vehicle forward/rearward direction is applied to the trailing arm at the time of rapid turning of the vehicle or the like, the stress is supported by the close plate 10 via the bracket reinforcement member 22 and the fixation nut 20 of the arm attachment bracket 14 that fastens and fixes the mount member 9. The close plate 10 is joined to an upper part of the rear side frame 3 and constitutes a large closed cross section elongated in the forward/rearward direction together with the rear side frame 3. Therefore, the stress in the vehicle forward/rearward direction that is applied to the trailing arm is strongly fixed by the close plate 10.

Further, when an impact load is input to the rear side frame 3 from a vehicle rearward side, the impact load is transmitted to the side sill 1 through a curve part of the front region 3F of the rear side frame 3 and the close plate 10 that closes the curve part from above. At this time, the close plate 10 efficiently transmits the input load to the inner part in the vehicle width direction of the side sill 1 through the second reinforcement bead 53 having a wide width and the first reinforcement bead 52 having a narrow width. Specifically, since the outer ridge line 50o that constitutes part of the first reinforcement bead 52 extends straight to a vehicle forward side from a position substantially directly above the vicinity of the rear end portion of the outer curve part 40o of the rear side frame 3, it is possible to efficiently transmit the input load to the inner region in the vehicle width direction of the side sill 1 and avoid concentration of stress on the curve part of the rear side frame 3.

Advantage of Embodiment

As described above, in the vehicle body rear part structure of the present embodiment, the outer ridge line 50o that extends straight in a vehicle forward direction from a position substantially directly above the vicinity of the rear end portion of the outer curve part 40o of the rear side frame 3 and the inner ridge line 50i that is curved substantially along the inner curve part 40i at a position substantially directly above the inner curve part 40i of the rear side frame 3 are provided on the close plate 10. The outer ridge line 50o and the inner ridge line 50i converge in an inner region in the vehicle width direction of the joint part of the side sill 1 and the rear side frame 3 in the close plate 10. Therefore, when an impact load is input to the rear side frame 3 from a vehicle rearward side, the input load can be efficiently transmitted along the outer ridge line 50o and the inner ridge line 50i of the close plate 10 to a converging part of the outer ridge line 50o and the inner ridge line 50i on the front side. Thereby, it is possible to efficiently transmit the impact load to the joint part of the rear side frame 3 and the side sill while avoiding stress concentration on the curve part of the rear side frame 3.

Accordingly, when the vehicle body rear part structure of the present embodiment is employed, even when the side walls of the front region 3F of the rear side frame 3 have the outer curve part 40o and the inner curve part 40i, it is possible to efficiently transmit the impact load that is input from a vehicle rearward direction to the side sill 1 without causing an irregular bend deformation of the close plate 10 or the rear side frame 3.

Further, in the vehicle body rear part structure of the present embodiment, the first auxiliary outer ridge line 43o that extends to be curved to a forward side at a position of the outer curve part 40o of the rear side frame 3 directly above a further outer region in the vehicle width direction than the vicinity of the rear end portion of the outer curve part 40o is provided on the close plate 10. Therefore, when an impact load is input to the rear side frame 3 from a vehicle rearward side, it is possible to transmit the impact load to a vehicle forward side along not only the outer ridge line 50o and the inner ridge line 50i on the close plate 10 but also the first auxiliary outer ridge line 43o. Accordingly, when the present configuration is employed, at the time of input of an impact load from a vehicle rearward direction, a stress is less concentrated on the inner curve part 40i or the outer curve part 40o of the rear side frame 3.

Further, in the vehicle body rear part structure of the present embodiment, the second auxiliary outer ridge line 45o that extends in a vehicle forward direction in parallel with the outer ridge line 50o at an outside in the vehicle width direction of the outer ridge line 50o is provided on the close plate 10, and the outer ridge line 50 and the second auxiliary outer ridge line 45o constitute the first reinforcement bead 52 that extends in a vehicle forward direction. Therefore, an impact load that is input to the rear side frame 3 from a vehicle rearward side can be efficiently transmitted to the side sill 1 through the first reinforcement bead 52.

Further, in the vehicle body rear part structure of the present embodiment, the first auxiliary outer ridge line 43o that extends to be curved to a vehicle forward side at a position of the outer curve part 40o of the rear side frame 3 directly above a further outer region in the vehicle width direction than the vicinity of the rear end portion of the outer curve part 40o is provided on the close plate 10, and the inner ridge line 50i and the first auxiliary outer ridge line 43o constitute the second reinforcement bead 53 that extends in a vehicle forward direction at an outside of the first reinforcement bead 52. Therefore, an impact load that is input to the rear side frame 3 from a vehicle rearward side can be further efficiently transmitted to the side sill 1 through the first reinforcement bead 52 and the second reinforcement bead 53.

Further, in the vehicle body rear part structure of the present embodiment, the close plate 10 is joined to the upper wall 1u on the inside of the side sill 1 and the inner flange 3fi of the rear side frame 3 and thereby constitutes a closed cross section together with the side sill 1 and the front region 3F of the rear side frame 3. Therefore, an impact load that is input to the rear side frame 3 and the close plate 10 from a vehicle rearward side can be further efficiently transmitted by the side sill 1.

Further, in the vehicle body rear part structure of the present embodiment, the close plate 10 is joined to the first cross member 6 that is connected to the side sill 1 in front of the rear side frame 3. Therefore, an impact load that is input to the rear side frame 3 and the close plate 10 from a vehicle rearward side can also be transmitted to the first cross member 6. Accordingly, when the present configuration is employed, the impact load that is input from a vehicle rearward side can be dispersed and supported by a wide area of the vehicle body.

Further, in the vehicle body rear part structure of the present embodiment, the arm attachment bracket 14 is fixed to the inside of the cross section of the front region 3F of the rear side frame 3, and the bracket reinforcement member 22 that extends substantially along the vehicle width direction is fixed to the dome-shaped part 16 of the arm attachment bracket 14. The end parts on both sides in the vehicle width direction of the bracket reinforcement member 22 is joined to the side sill 1 and the second cross member 7, and the close plate 10 is joined to an upper part of the bracket reinforcement member 22. Thereby, the arm attachment bracket 14 and the bracket reinforcement member 22 reinforce the cross section of the front region of the close plate 10 and the rear side frame 3, and the bracket reinforcement member 22 connects the side sill 1 to the second cross member 7. Accordingly, when the vehicle body rear part structure of the present embodiment is employed, an impact load that is input to the rear side frame 3 and the close plate 10 from a vehicle rearward side can be efficiently transmitted to the side sill 1 and the second cross member 7.

Further, in the vehicle body rear part structure of the present embodiment, the longitudinal ridge line 30a along the vehicle forward/rearward direction and the lateral ridge line 30b along the vehicle width direction are provided in the vicinity of the top portion of the dome-shaped part 16 of the arm attachment bracket 14. Therefore, it is possible to enhance the rigidity of the dome-shaped part 16 by the longitudinal ridge line 30a and the lateral ridge line 30b. The ridge line that is formed in the vicinity of the top portion of the dome-shaped part 16 may be only any one of the longitudinal ridge line 30a and the lateral ridge line 30b, and in that case, it is also possible to enhance the rigidity of the dome-shaped part 16. Accordingly, when the present configuration is employed, an impact load that is input from a vehicle rearward side and an impact load that is input from a vehicle lateral side can be received by the dome-shaped part 16 having a high rigidity.

The present invention is not limited to the embodiment described above, and various design changes can be made without departing from the scope of the invention.

For example, the above embodiment is described using an example in which the outer end part in the vehicle width direction of the bracket reinforcement member 22 is directly joined to the vicinity of the inner angle part ci above the side sill 1; however, the outer end part in the vehicle width direction of the bracket reinforcement member 22 may be indirectly joined to the vicinity of the inner angle part ci above the side sill 1 via a separate member. Further, the above embodiment is described using an example in which the inner end part in the vehicle width direction of the bracket reinforcement member 22 is indirectly joined to the outer end part in the vehicle width direction of the second cross member 7 via the inner flange 3fi of the rear side frame 3; however, the inner end part in the vehicle width direction of the bracket reinforcement member 22 may be directly joined to the outer end part in the vehicle width direction of the second cross member 7.

What is claimed is:

1. A vehicle body rear part structure comprising:
   a side sill that is disposed below a side part of a passenger compartment substantially in a vehicle forward/rearward direction;
   a rear wheel house that is disposed behind the side sill;
   a rear side frame that extends to be curved along a curve shape of a horizontal cross section of a front part of the rear wheel house from an inner region in a vehicle width direction of the rear wheel house and that has a front region which is joined to an inside in the vehicle width direction of the side sill; and
   a close plate that closes an upper part of a substantially C-shaped cross section that opens to an upper side of the rear side frame,
   wherein an outer curve part having an outer side wall in the vehicle width direction that curves outward in the vehicle width direction substantially along a shape of a front part of the rear wheel house and an inner curve part having an inner side wall in the vehicle width direction that curves outward in the vehicle width direction substantially along the shape of the front part of the rear wheel house are provided in a region close to the front part of the rear wheel house of the rear side frame,
   an outer ridge line that extends straight in a vehicle forward direction from a position substantially directly above a vicinity of a rear end portion of the outer curve part of the rear side frame and an inner ridge line that extends to be curved to a vehicle forward side substantially along the inner curve part at a position substantially directly above the inner curve part of the rear side frame are provided on the close plate, and the outer ridge line and the inner ridge line converge in an inner region in the vehicle width direction of a joint part of the rear side frame and the side sill.

2. The vehicle body rear part structure according to claim 1, wherein a first auxiliary outer ridge line that extends to be curved to a forward side at a position directly above a further outer region in the vehicle width direction than the vicinity of the rear end portion of the outer curve part of the rear side frame is provided on the close plate.

3. The vehicle body rear part structure according to claim 1, wherein a second auxiliary outer ridge line that extends in a forward direction in parallel with the outer ridge line at an outside in the vehicle width direction of the outer ridge line is provided on the close plate, and the outer ridge line and the second auxiliary outer ridge line constitute a first reinforcement bead that is raised above the close plate and extends in a vehicle forward direction.

4. The vehicle body rear part structure according to claim 3, wherein a first auxiliary outer ridge line that extends to be curved to a forward side at a position directly above a further outer region in the vehicle width direction than the vicinity of the rear end portion of the outer curve part of the rear side frame is provided on the close plate, and the inner ridge line and the first auxiliary outer ridge line constitute a second reinforcement bead that is raised above the close plate and extends in a vehicle forward direction at an outside of the first reinforcement bead.

5. The vehicle body rear part structure according to claim 1, wherein an inner flange that extends inward in the vehicle width direction from an upper part of an inner side wall in the vehicle width direction is provided on the front region of the rear side frame, and the close plate is joined to an upper wall on an inside of the side sill and the inner flange and constitutes a closed cross section together with the side sill and the front region of the rear side frame.

6. The vehicle body rear part structure according to claim 1, wherein the close plate is joined to a first cross member that is connected to the side sill in front of the rear side frame.

7. The vehicle body rear part structure according to claim 1, further comprising:

a trailing arm having a front end part that is swingably supported via a mount member at the front region of the rear side frame;

a second cross member that extends substantially in the vehicle width direction and that has an outer end part in the vehicle width direction which is connected to the front region of the rear side frame; and an arm attachment bracket which is fixed to an inside of a cross section having a substantially C shape which opens to an upper side of the front region of the rear side frame and to which the mount member is attached, wherein the arm attachment bracket includes a dome-shaped part that covers the mount member from above, a bracket reinforcement member that extends substantially in the vehicle width direction is fixed to the dome-shaped part, end parts on both sides in the vehicle width direction of the bracket reinforcement member are directly or indirectly joined to the side sill and the second cross member, and the close plate is joined to an upper part of the bracket reinforcement member.

8. The vehicle body rear part structure according to claim 7, wherein at least one ridge line along the vehicle forward/rearward direction or the vehicle width direction is provided near a top portion of the dome-shaped part of the arm attachment bracket.

* * * * *